United States Patent [19]

Eckberg

[11] 4,340,647
[45] Jul. 20, 1982

[54] VINYL GUM CURE ACCELERATORS FOR ADDITION-CURE SILICONE

[75] Inventor: Richard P. Eckberg, Round Lake, N.Y.

[73] Assignee: General Electric Company, Waterford, N.Y.

[21] Appl. No.: 267,091

[22] Filed: May 22, 1981

[51] Int. Cl.$^3$ .............................................. B32B 9/00
[52] U.S. Cl. ............................ 428/429; 427/387; 427/391; 428/342; 428/438; 525/477; 525/478; 525/479; 528/15; 528/31; 528/32; 524/588
[58] Field of Search ........................ 528/15, 31, 32; 525/477, 478, 479; 260/33.6 SB; 428/429, 342, 438; 427/387, 391

[56] References Cited

U.S. PATENT DOCUMENTS

| | | | |
|---|---|---|---|
| 3,159,601 | 12/1964 | Ashby | 528/15 |
| 3,220,972 | 11/1965 | Lamoreaux | 528/31 |
| 3,714,204 | 1/1973 | Lamont | 525/478 |
| 4,057,596 | 11/1977 | Takamizawa et al. | 525/478 |
| 4,256,870 | 3/1981 | Eckberg | 528/12 |

*Primary Examiner*—Melvyn I. Marquis
*Attorney, Agent, or Firm*—Michael J. Doyle

[57] ABSTRACT

There are provided addition-curable silicone release compositions comprised of a vinyl or silanol functional polymer base, a crosslinker containing silanic hydrogen, a precious metal catalyst such as platinum or rhodium, an optional carboxylic ester inhgibitor and silicone vinyl gum cure accelerations effective for allowing thermal cure at relatively lower temperatures while minimizing the necessity of excess metal catalyst.

19 Claims, No Drawings

VINYL GUM CURE ACCELERATORS FOR ADDITION-CURE SILICONE

BACKGROUND OF THE INVENTION

The present invention relates to addition cure polysiloxane compositions with vinyl gum cure accelerators which are particularly well suited for coating applications and are especially useful in the manufacture of paper and other articles having release coatings.

Silicone compositions have long been used for rendering surfaces nonadherent to materials which would normally adhere thereto. For a long time, it was necessary that these silicone coatings be applied as a dispersion within a solvent in order to control the viscosity of the coating material so as to be suitable for coating applications. However, although the solvent aids in the application of the coating, it is a highly inefficient process inasmuch as the solvent must thereafter be evaporated. The evaporation of solvents requires large expenditures of energy and pollution control requirements mandate that solvent vapors be prevented from escaping into the air. Removal and recovery of all the solvent entail considerable expenditure for apparatus and energy.

Thus, it has been noted that there is a need to provide a solventless coating composition which will, however, remain easy to apply to the substrate. Such solventless coating compositions are sometimes referred to as "100% solids" compositions. The absence of solvent in such compositions both lowers the amount of energy required to effect a cure and eliminates the need for expensive pollution abatement equipment. It is noted that even previous solventless coatings are limited to certain applications because oven cure temperatures must still be in the neighborhood of 300° F. minimum, at which temperature many substrates are thermally degraded. Although cure time can be shortened with solventless grades, high temperatures can require that only high-density paper or high-melting point plastics and the like be utilized, so that the substrate will not char, melt or otherwise degrade during cure. The composition of the present invention is a low viscosity polydiorganosiloxane fluid which can readily be coated onto a substrate with or without solvent by standard methods such as blade, press, brush or gravure and which will thermally cure onto the substrate to form a nonadherent surface at lower temperatures than previously necessary.

Silicone release coating compositions made in accordance with U.S. Pat. No. 4,256,870 (Eckberg) can be cured at temperatures as low as 200° F. thereby enabling coating upon a wider range of substrates than formerly possible. However, to effect an acceptable cure at reduced temperatures a large amount of platinum catalyst is required. For example, as much as eight times the amount of platinum might be necessary for low temperature cure compared to the composition in the Eckberg patent undergoing conventional high temperature cure.

Since the high platinum concentration (e.g. 200 ppm instead of 25 ppm) adds a large cost to such grades, there was considerable interest in efforts to limit the level of required platinum without sacrificing low temperature cure performance. As a result of the present invention, it has been discovered that certain vinyl functional siloxane gums will act as cure accelerators allowing lower temperature cure with levels of platinum much lower than would be required in the absence of the vinyl gums.

Release coatings are useful for many applications whenever it is necessary to provide a surface or material which is relatively nonadherent to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar, and other such substrates are also useful as non-stick surfaces for food handling and industrial packaging applications.

For example, when labels are coated with an adhesive it is desirable that the paper backing be easily peeled away from the label when it is ready for use, yet the adhesive quality of the label should not be derogated by the fact that it has been peeled away from the substrate upon which it was stored. The same principle applies to certain types of adhesive tapes which come in rolls. It is necessary that the tape unroll easily and still maintain its adhesive characteristics. This can be accomplished by coating the nonadhesive side of the tape with a silicone release composition which will come into contact with the adhesive as the roll of tape is manufactured.

Two other problems previously encountered with silicone compositions of the above-described type are related to premature gelation of the composition. Inasmuch as a typical composition can be made up of a vinyl chainstopped base polymer, and a platinum metal catalyst, premature curing may occur over a length of time resulting in a product with unsatisfactory shelf-life. Furthermore, when the composition is ready for use, at which time a reactive crosslinking agent is introduced, it is desirable that the catalyzed polymer composition have a sufficiently long pot-life to enable one skilled in the art to carry out the coating application.

These additional problems were solved in U.S. Pat. No. 4,256,870 (Eckberg) which is hereby incorporated by reference, which provided solventless addition cure silicone release coating compositions which contained effective inhibitor components which provided stable products. These compositions were thermally cured at elevated temperatures to obtain release coatings. As noted, it is necessary that increased amounts of precious metal catalysts such as platinum or rhodium be utilized in order to effectively lower the cure temperature of these coatings, but at significantly increased cost.

Therefore, a primary objective of the present invention is to provide a solventless composition which will render surfaces nonadherent to materials which would normally adhere thereto.

Another object of the present invention is to provide a solventless coating composition with a satisfactory shelf-life which will cure at relatively low temperatures.

Another object of the present invention is to provide a solventless coating composition utilizing novel vinyl siloxane gum cure acclerators.

Another object of the present invention is to provide a method of rendering materials nonadherent to other materials which would normally adhere thereto.

Another object is to provide articles of manufacture having nonadherent surfaces by coating the articles with the release compositions of the present invention.

Another object of the present invention is to provide a solventless silicone composition which is particularly well suited for paper release applications.

SUMMARY OF THE INVENTION

The present invention involves a silicone release coating composition comprising a base polymer such as a vinyl chainstopped polydialkyl-alkylvinyl polysiloxane base copolymer and a methylhydrogen crosslinking fluid. This composition is catalyzed by platinum or a platinum metal which will initiate an addition cure reaction. Ordinarily the crosslinking compound is added at the time of use to the other ingredients. Generally, any silicone base polymer having alkenyl or silanol functionality will lend itself to a precious metal catalyzed hydrosilation or condensation cure reaction of the present invention. An inhibitor such as diallylmaleate or dimethylmaleate can be added to the composition in order to selectively retard the cure reaction so as to provide adequate shelf-life and workable pot-life for the coating composition. There is also added a dimethylvinyl chainstopped polydimethylmethylvinylsiloxane polymer gum which will accelerate the hydrosilation cure reaction at relatively low temperature without sacrificing performance. It is believed that excesses of platinum catalyst can be avoided since the vinyl gum raises the efficiency of the crosslinking reaction thereby reducing the required amount of catalyst for a given temperature and cure time polymer. In a sense the highly polymerized gum reduces the amount of crosslinking required of the catalyst and facilitates a reduction in amount of catalyst at any given temperature. This vinyl gum will ordinarily be contained in the crosslinkable polymer base along with the catalyst and optional inhibitor. Addition of the crosslinking agent at the time of use provides the coating composition.

DESCRIPTION OF THE PREFERRED EMBODIMENTS

The present invention provides silicone release coating compositions which may be utilized in solventless form if a catalyst inhibitor is also used, or they may be provided in a solvent dispersion without the necessity of such an inhibitor.

The addition curable compositions will ordinarily be comprised of a mixture of several ingredients which can be coated upon a substrate such as paper and when cured thereon will form a coating which is relatively nonadherent towards materials which would normally adhere thereto, such as organic adhesives.

The major ingredient in such a composition will ordinarily be a diorganopolysiloxane base polymer which will preferably have up to approximately 20% by weight of alkenyl or silanol functional groups and a viscosity of, approximately, 50 to 100,000 centipoise at 25° C. The preferred alkenyl group for such polymers is vinyl, while the remainder of the organic groups are preferably methyl.

The second major ingredient in the release composition is a polymethylhydrogen siloxane fluid crosslinking agent, having up to, approximately, 100% by weight SiH-containing groups and a viscosity of, approximately, 25 to 1000 centipoise at 25° C.

The base polymer and crosslinker are catalyzed by an effective amount of precious metal catalyst for facilitating a well known addition cure hydrosilation reaction between these materials. Particularly preferred catalysts will be complexes of platinum and rhodium which will be described below. Those skilled in the art will be able to vary the amount of catalyst to effect the rate of cure. For example, as taught in U.S. Pat. No. 4,256,870, satisfactory cure can be obtained at approximately 150° C. by utilizing approximately 25 ppm platinum metal. As will be seen, the present invention allows satisfactory cure at as low as 90° C. without requiring excessive amounts of platinum catalyst. Of course, thermal cures of 300° C. or more could still be utilized as long as the substrate does not deform.

To prevent premature gellation of the composition, U.S. Pat. No. 4,256,870 also teaches that a dialkyl carboxylic ester will effectively inhibit the addition cure reaction until thermal cure is desired. Suitable inhibitors include dimethylmaleate, and diallylmaleate. Of course the amount needed will vary according to the amount of catalyst which must be inhibited. It is to be noted that such inhibitors are not essential in a solvent based system but may be used if desired.

The silicone compositions of the present invention also contain a so-called vinyl gum accelerator which facilitates or enhances the rate of cure at as little as 90° C. such that satisfactory cure times can be obtained with reduced amounts of catalyst.

Heretofore, if satisfactory cure time was required at 90° or 100° C. for example, the coating required at least 200 ppm platinum or rhodium catalyst generally in the form of a silicone-soluble complex, which required at least, at least 1.25 weight percent dimethylmaleate (DMM) to effectively inhibit cure at ambient conditions. But by utilizing an effective amount of the vinyl gum accelerator, the same satisfactory cure could be obtained with only 150 ppm platinum and 0.9% DMM. This represents a 25% reduction in the amount of platinum required in this example which is a significant cost savings.

As little as 0.5 weight percent of this vinyl gum will exhibit some effect, and ordinarily up to 10 weight percent based upon the total weight of the base polymer will be used. Greater than 10 weight percent of the vinyl gum can also be used, but since it is quite viscous it is relatively more difficult to get it into solution in the silicone base polymer, especially for coating applications.

The particularly preferred vinyl gums for use as cure accelerators in the present invention are essentially linear dimethylvinyl chainstopped polydimethylmethylvinyl siloxane polymers having an average molecular weight of, approximately, 200,000 to 400,000. This material can be obtained by well known means by using appropriate amounts of dimethylvinylsilyl chainstoppers, methyltetramer and methylvinyl tetramer. Such polymers can also have from 0 to 5 mole % methylvinylsiloxy content but vinyl ion the chain does not have the same advantageous effect as does the vinyl chainstopper in such gums.

The release composition of the present invention is particularly well suited for rendering materials nonadherent to other normally adherent materials such as glue and adhesives. Additionally, the composition can be applied directly to a substrate without the need for a solvent, thus avoiding all of the problems associated with coating solvents as described above.

The composition is a polysiloxane made up of several ingredients which will thermally cure on the substrate upon which it is coated, and render the substrate nonadherent. A major proportion of the composition is typically a vinyl chainstopped polysiloxane having the formula

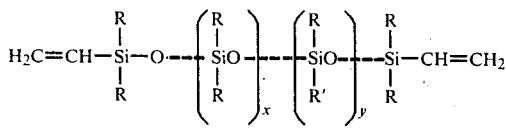

wherein R is a monovalent hydrocarbon radical free of unsaturation. Suitable radicals for R include, for example, methyl, ethyl, proply, butyl, and other similar saturated hydrocarbons, but ordinarily would not include phenyl groups for paper release purposes. R' is a hydrocarbon radical having alkenyl unsaturation. Typically, R' represents vinyl groups but may also represent allylic or cyclo-alkenyl unsaturated groups. X and Y are positive integers so that the vinyl chain-stopped polysiloxane has up to approximately 20% by weight of R' groups. The viscosity of such a polysiloxane ranges from approximately 50 to approximately 100,000 centipoise at 25° C. Preferably, the vinyl chainstopped polysiloxane has up to approximately 20% by weight of vinyl groups represented by R' and the viscosity of this polymer ranges from approximately 300 to approximately 550 centipoise at 25° C. The preferred vinyl chainstopped polysiloxane has the formula

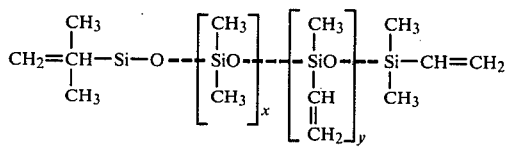

wherein X and Y are as described above.

Methylhydrogen fluid is often used by those skilled in the silicone art as a crosslinking agent for addition-cured silicone systems. Particularly useful as a crosslinking agent for the present invention is a trimethyl chainstopped polymethylhydrogen siloxane fluid having from approximately 10% to approximately 100% SiH-containing siloxy groups and having a viscosity in the range of approximately 25 to approximately 1,000 centipoise at 25° C.

The curing reaction which takes place between the vinylfunctional polysiloxane and the polymethylhydrogensiloxane fluid crosslinking agent is an addition cure reaction, also known as a hydrosilation. The composition of the present invention may be thermally cured by means of a platinum metal catalyzed crosslinking reaction between the pendant vinyl groups of a dialkylvinyl chainstopped polydialkyl-alkylvinylsiloxane copolymer and the H-Si groups of a trimethyl chainstopped polymethylhydrogen fluid.

A useful catalyst for facilitating the hydrosilation curing reaction is the Lamoreaux catalyst as described in U.S. Pat. No. 3,220,972 issued Nov. 30, 1965, and assigned to the same assignee as the present invention. Another is the catalyst proposed by Ashby in U.S. Pat. No. 3,159,601. Other Group VIII-metal catalysts can also be utilized in practicing the present invention and their selection depends upon such factors as speed of the reaction required as well as expense, useful shelf-life, useful pot-life and the temperature at which the cure reaction is to take place. Such precious-metal catalysts include those which utilize the metals ruthenium, rhodium, palladium, osmium, iridium and platinum, and complexes of these metals. In U.S. Pat. No. 4,262,107 the present inventor proposed several rhodium catalysts useful in silicone rubber compositions. It is believed that these catalysts should also be useful in the addition cure release composition of the present invention. All of the patents mentioned in this paragraph are hereby incorporated by reference. For coating compositions as described above, the amount of catalyst ranges from approximately 10 to approximately 500 ppm of metal, again depending upon the factors of speed of reaction and cost. Preferably, the amount of catalyst is approximately 10 to 50 ppm of precious metal.

EXAMPLE 1

Prior art silicone release coatings can be prepared in accordance with U.S. Pat. No. 4,256,870 (Eckberg) and may be comprised of linear dimethylvinyl chainstopped polydimethylmethylvinyl siloxane fluid having a viscosity of approximately 300 to 600 centipoise and a vinyl on the chain (V.O.C.) content of approximately 3.7 weight percent ($D^{vi}$). An amount of a chloroplatinic acid-octyl alcohol complex catalyst prepared as instructed by Lameroux in U.S. Pat. No. 3,220,972 which was sufficient to provide approximately 25 ppm platinum (as Pt metal) along with 0.25 weight percent diallylmaleate inhibitor was used to complete the prior art composition. This composition requires a minimum oven temperature of 150° C. to effect cure at useful rates. For low temperature curing, approximately 200 ppm platinum catalyst is utilized as described in U.S. Pat. No. 3,159,601 (Ashby) is utilized rather than the 25 ppm Lameroux catalyst. This catalyst is a complex of chloroplatinic acid and tetravinyltetramethyl cyclotetrasiloxane. Dimethyl maleate (DMM) is used as an inhibitor at a rate of 1.25 weight percent DMM based upon the weight of polymer. The coating composition is completed upon addition of 4 parts methylhydrogen siloxane crosslinking fluid, per 100 parts of the catalyst-containing polymer-inhibitor mixture.

Initial experiments were performed in which test batches of the prior art-type compositions were prepared in the fashion described above, except for varying the amount of the platinum catalyst and changing the dimethylmaleate concentration according to such changes in platinum level. The following cure profiles demonstrate the effect of lower platinum levels on cure performance in these solventless compositions.

| Cure Profile A (200 ppm Pt) T, °F. cure time, sec. | | Cure Profile B (175 ppm Pt) T, °F. Cure time, sec. | | Cure Profile C (150 ppm Pt) T, °F. Cure time, sec. | |
| --- | --- | --- | --- | --- | --- |
| 200 | 25 | 200 | 35 | 200 | 60 |
| 250 | 15 | 250 | 20 | 250 | 30 |
| 300 | 5 | 300 | 5 | 300 | 10 |

It is apparent that small reductions in platinum content result in unacceptable loss of cure, particularly at lower temperatures. However, it was found that the addition of a small amount of a soft vinyl-functional gum to the solventless compositions containing 150 ppm platinum (representing a 25% reduction in platinum usage from the prior art composition) restored the low-temperature cure performance otherwise lost. The vinyl gum is a soft (3000 to 7000 penetration) dimethyl vinyl-stopped siloxane gum with 0.2 mole % methylvinyl D' units on the linear polymer chains. The molecular structure of the gum is analogous to that of the vinyl base polymer in the prior art composition save for a much higher molecular weight of approximately 300,000. The effect of gum increments on the cure performance of the experimental blend can be seen in the table below.

| Additional Vinyl Gum, % | 200° F. Cure | 250° F. Cure | 300° F. Cure |
|---|---|---|---|
| 0 | 60 sec. | 30 sec. | 10 sec. |
| 2.5 | 45 sec. | 30 sec. | 5 sec. |
| 3 | 40 sec. | 20 sec. | 5 sec. |
| 3.5 | 35 sec. | 15 sec. | 5 sec. |
| 4 | 30 sec. | 15 sec. | 5 sec. |
| 5 | 25 sec. | 12 sec. | 5 sec. |

The addition of 5 weight % vinyl gum provides essentially identical cure performance in the experimental grade as is generally observed for the prior art compositions, the advantage being the lower level of platinum catalyst required in the gum-containing composition.

EXAMPLE 2

While it is theoretically possible to blend higher amounts of gums into the solventless base polymer, the high viscosity (e.g. 2000 cps.) of resulting compositions renders them difficult to coat via standard offset gravure techniques so that incremental gum adjustments are limited to approximately 5% for solventless paper release grades. The use of vinyl gum in solventless paper release grades intended for low temperature applications is illustrated by a composition, the preparation of which is summarized as follows.

A base polymer was prepared by blending 95.2 parts dimethyltetramer, 1.8 parts methylvinyltetramer, and 3 parts dimethylvinyl chainstopper, then polymerizing the mixture with standard $KOH/H_3PO_4$ equilibration/neutralization techniques. After removal of lite ends, a vinyl-stopped dimethylmethylvinyl copolymer base polymer fluid of 118 cps. viscosity was obtained. 5 parts of the vinyl stopped polydimethyl methylvinylsiloxane gum described in Example 1 was blended with 100 parts of the base polymer fluid to afford a fluid mixture of 410 cps. viscosity. Sufficient platinum catalyst was added to the fluid mixture to provide 150 ppm platinum, plus 0.9 weight % dimethylmaleate inhibitor. The cure profile obtained for this composition was essentially identical to the cure profile typically noted for the prior art composition (see Cure Profile A), despite the 25% reduction in platinum level.

EXAMPLE 3

A composition was prepared by KOH-catalyzed equilibration of 97 parts octamethyltetracyclosiloxane and 3 parts sym-divinyltetramethyldisiloxane. A dimethylvinyl chainstopped linear polydimethylsiloxane polymer fluid was obtained having 132 cps. viscosity. 100 parts of the polymer fluid was then mixed with 5 parts of a 5200 penetration (approximately 300,000 MW) linear dimethylvinyl-stopped polydimethylmethylvinylsiloxane copolymer gum including approximately 0.2 mole % vinyl D groups on the linear chains. This mixture was agitated at 150° C. for 4 hours to yield a smooth, free-flowing dispersion of gum in fluid, 440 cps. viscosity. This blend was cooled to 80° C. and sufficient trichloro-rhodium (III) tris (dibutylsulfide) (dissolvedin methanol) was added to provide 75 ppm rhodium in the composition, the methanol being removed in vacuo. The solventless product was completed with the addition of 0.33 weight percent dimethylmaleate inhibitor. The rhodium compound used was prepared as described by Fergusson et al., J. Chem. Soc. 1965, 2627. A control material was also prepared consisting of a 400 cps. dimethylvinyl-stopped polymethylsiloxane fluid but with no gum and with precisely the same concentration of rhodium catalyst and dimethylmaleate inhibitor present in Example 3.

Coating baths were prepared by mixing 10 parts of Example 3 (or the control) with 0.4 parts of a trimethylsilyl-stopped polymethylhydrosiloxane fluid crosslinker. This material is available from General Electric Company as SS-4300c. The cure performance of these coating baths was ascertained as described above, with the following results observed on (SCK) super calendared Kraft paper substrates:

| | Minimum Cure Time, seconds | |
|---|---|---|
| Composition | 250° F. | 350° F. |
| Example 3 | 30 | 5 |
| Control | No Cure* | 15 |

*Migration and rub-off was noted on cured films, even after 90 min. at 250°.

It is thus clear that vinyl gum cure accelerators of the present invention are also effective for hydrosilation catalysts other than standard platinum-containing catalysts.

EXAMPLES 4 to 7

Two experimental compositions were prepared via standard KOH-catalyzed equilibration of $D_4$, and $M^{vi}M^{vi}$ siloxanes. Example 4 included 97.5 parts of $D_4$, 1 part of $D_4^{vi}$ and 1.5 parts of $M^{vi}M^{vi}$ chainstopper. After equilibration, neutralization, and removal of polymer lite ends, a 350 cps. fluid product was obtained. A second composition, Example 5, included 98 parts $D_4$, 0.5 parts $D_4^{vi}$ and 1.5 parts $M^{vi}M^{vi}$ chainstopper, and, following conventional processing techniques, yielded a 360 cps. fluid product which was indistinguishable from Example 4 except for the amount of vinylsiloxane $D^{vi}$ units on the linear chains. Both of these fluids were then treated with sufficient platinum catalyst (Lameroux, U.S. Pat. No. 3,220,972) to furnish 25 ppm Pt plus 0.25% diallylmaleate inhibitor (Eckberg, U.S. Pat. No. 4,256,870). It should be noted that no vinyl gum was included in these compositions.

Two other experimental compositions were prepared as described above. A fluid was prepared by equilibration of 96 parts $D_4$, 1 part $D_4^{vi}$, and 3 parts $M^{vi}M^{vi}$ chainstopper. After neutralization and stripping off lite ends, the fluid viscosity was 125 cps. To 100 parts of this fluid was added 5 parts of a dimethylvinyl-stopped polydimethyl-methylvinylsiloxane gum having a molecular weight of approximately 300,000. Agitation of this mixture at 150° C. for 4 hours completely dissolved the gum in the fluid thereby affording a 400 cps mixture which was designated Example 6. A fourth fluid mixture, Example 7, was prepared (including the vinyl gum) in an identical fashion as Example 6, except for incorporation of 0.5 parts $D_4^{vi}$ rather than 1.0 parts $D_4^{vi}$ in theoriginal charge. Platinum catalyst and diallylmaleate inhibitor were added to these two fluids precisely as described for the previous two examples to complete the processing.

All four compositions were than qualitatively checked for cure on 40 lb. supercalendered Kraft substrates in this fashion: 10 parts of the test fluid were combined with 0.3 parts crosslinker (MeH fluid, grade SS-4300c described above) and this blend was manually coated onto the paper substrate with a doctor blade. The coated paper was then hung in a forced-air oven at 350° F. until a cured migration-free nonadherent abhesive surface was obtained. Results are tabulated below:

| Blend | Minimum Cure Time, 350° F. |
|---|---|
| Example 4 | 60 sec.* |
| Example 5 | 60 sec.* |
| Example 6 | 30 sec. |
| Example 7 | 30 sec. |

*Some migration still noted after 60 sec. at 350° F.

Clearly, the presence of 5 weight percent vinyl gum in these compositions provides a significant improvement in the cure performance when all other components of the blends are held constant.

EXAMPLE 8

The practice of this invention not only provides for faster cure than would otherwise be observed but, equally important, a relatively more complete cure is also obtained. An incomplete cure of the release agent results in significant amounts of uncured free silicone on the abhesive (or nonadherent) coating. When laminated against pressure-sensitive adhesive over normal storage periods, the uncured silicone will slowly migrate into the adhesive layer. The result of such a process is an undesirable loss of adhesive tack as the laminate ages. Therefore, the more complete the cure of the solventless release coating, the better the aging characteristics of laminated articles manufactured with the silicone release liner.

Experiments were run to determine the relative degree of cure for solventless release coatings. Silicone coatings on SCK substrate were applied and cured as described above. Exactly 32 in$^2$ of the coated paper was then treated with 15 grams of hexane at 60° C. for 120 seconds. The hexane was then placed in tared aluminum weighing cups and evaporated to dryness in an oven. Uncured silicone extracted from the coated paper was left as a residue in the aluminum vessels. The weight of extracted silicone serves as a relative measure of degree of cure; i.e. the more residue detected, the poorer the degree of cure. Tests were conducted with the standard solventless grade described as the high temperature prior art material in Example 1 (which contains no vinyl gum) and on the experimental grade of Example 7 described above. Each sample was blended with 3 weight percent crosslinker prior to coating and curing at 350° F. for 30 seconds. It should be pointed out that these tested materials have identical amounts of the Lameroux platinum catalyst and diallylmaleate inhibitor. 5 hexane extractions were performed on each composition, with these results:

| Grade | Extractibles, mg |
|---|---|
| Prior Art | 4.2 ± 0.6 |
| Example 7 | 1.9 ± 0.3 |

Thus it can be seen that inclusion of 5 weight percent vinyl gum in solventless silicone release products provides not only a faster, but a more complete, and therefore superior cure.

What is claimed as new and desired to be protected by Letters Patent of the United States is:

1. A silicone release coating composition comprising:
   A. A solventless addition curable composition comprised of:
      (i) a diorganopolysiloxane base polymer having up to approximately 20% by weight alkenyl or silanol functional groups and having a viscosity ranging from approximately 50 to approximately 100,000 centipoise at 25° C.;
      (ii) a polymethylhydrogen siloxane fluid crosslinking agent having up to approximately 100% by weight SiH-containing siloxy groups and having a viscosity in the range of approximately 25 to approximately 1000 centipoise at 25° C.;
      (iii) an effective amount of precious metal catalyst for facilitating an addition cure hydrosilation reaction between said base polymer and said crosslinking agent at temperatures between, approximately, 90° C. to 300° C.;
      (iv) an amount of dialkyl carboxylic ester containing carbon to carbon unsaturation effective to inhibit the precious metal catalyzed hydrosilation cure reaction of said silicone composition at temperatures below the heat cure temperature of said silicone composition, and
   B. an amount of dimethylvinyl chainstopped polydimethylmethylvinylsiloxane polymer gum effective for accelerating the cure of said addition curable composition wherein said gum has an average molecular weight of, approximately, 200,000 to 400,000.

2. A composition as in claim 1 wherein said gum is present in an amount of at least 0.5 weight percent of said addition curable composition.

3. A composition as in claim 1 wherein said gum has a methyl-vinyl siloxy unit content if 0 to 5 mole % of said gum.

4. A silicone release coating composition comprising:
   A. a solvent based addition curable composition comprised of:
      (i) a diorganopolysiloxane base polymer having up to approximately 20% by weight alkenyl or silanol functional groups and having a viscosity ranging from approximately 50 to approximately 100,000 centipoise at 25° C.;
      (ii) a polymethylhydrogen siloxane fluid crosslinking agent having up to approximately 100% by weight SiH-containing siloxy groups and having a viscosity in the range of approximately 25 to approximately 1000 centipoise at 25° C.;
      (iii) an effective amount of precious metal catalyst for facilitating an addition cure hydrosilation reaction between said base polymer and said crosslinking agent at temperatures between approximately, 90° to 300° C.;
      (iv) an amount of hydrocarbon solvent effective for dispersing said addition curable composition; and
   B. an amount of dimethylvinyl chainstopped polydimethylmethylvinylsiloxane polymer gum effective for accelerating the cure of said addition curable composition wherein said gum has an average molecular weight of, approximately, 200,000 to 400,000.

5. A composition as in claim 4 wherein said gum is present in an amount of at least 0.5 weight percent of said addition curable composition.

6. A composition as in claim 4 wherein said solvent is selected from the group consisting of hexane, toluene, naptha, xylene, and benzene and mixtures thereof.

7. A composition as in claim 4 wherein said gum has a methyl-vinyl siloxy content of 0 to 5 mole % of said gum.

8. A composition as in claim 2 or 5 wherein said gum is present in an amount of, approximately, 5 to 10 weight percent of said addition curable composition.

9. The cured product of claim 1 or 4.

10. An article of manufacture comprising a paper substrate coated with the composition of claim 1 or 4.

11. A method for rendering substrates relatively nonadherent to substances that would normally adhere thereto, comprising the steps of:
A. combining
  (a) a diorganopolysiloxane base polymer having up to approximately 20% by weight alkenyl or silanol functional groups and having a viscosity ranging from approximately 50 to approximately 100,000 centipoise at 25° C.;
  (b) a polymethylhydrogen siloxane fluid crosslinking agent having up to approximately 100% by weight SiH-containing siloxy groups and having a viscosity in the range of approximately 25 to approximately 1000 centipoise at 25° C.;
  (c) an effective amount of precious metal catalyst for facilitating an addition cure hydrosilation reaction between said base polymer and said crosslinking agent at temperatures between, approximately, 90° to 300° C.; and
  (d) an amount of dimethylvinyl chainstopped polydimethylmethylvinyl siloxane polymer gum effective for accelerating the cure of an addition curable composition wherein said gum has an average molecular weight of, approximately, 200,000 to 400,000 and a methyl-vinyl siloxy unit content of, approximately, 0 to 5.0 mole %.

12. A method as in claim 11 further comprising the step of coating said composition upon a substrate.

13. A method as in claim 12 further comprising the step of curing said composition.

14. A process as in claim 12 wherein said substrate is paper.

15. A process in claim 11 wherein said addition curable composition is further comprised of an amount of dialkyl carboxylic ester containing carbon to carbon unsaturation effective to inhibit the precious metal catalyzed hydrosilation cure reaction of said silicone composition at temperatures below the heat cure temperature of said silicone composition.

16. A process as in claim 11 wherein said addition curable composition is dispersed in a solvent.

17. A process as in claim 11 wherein said gum is present in an amount of at least 0.5 weight percent of said addition curable composition.

18. A product made by the process of claim 11.

19. A silicone composition capable of low temperature crosslinking to a nonadherent film when combined with a methyl hydrogen siloxy crosslinking fluid, comprised of:
  (a) a diorganopolysiloxane base polymer having up to approximately 20% by weight alkenyl and silanol functional groups and a viscosity of, approximately, 50 to 100,000 centipoise at 25° C.;
  (b) an effective amount of precious metal catalyst for facilitating an addition cure hydrosilation reaction at temperatures between 90° to 300° C.;
  (c) an amount of dialkyl carboxylic ester effective to inhibit said hydrosilation cure reaction at temperatures below the heat cure temperature of said composition; and
  (d) an amount of dimethylvinyl chainstopped polydimethylvinylsiloxane gum effective for accelerating the cure of said composition.

* * * * *

UNITED STATES PATENT AND TRADEMARK OFFICE
CERTIFICATE OF CORRECTION

PATENT NO. : 4,340,647
DATED : July 20, 1982
INVENTOR(S) : Richard P. Eckberg

It is certified that error appears in the above-identified patent and that said Letters Patent are hereby corrected as shown below:

Column 5, lines 26-32, rewrite the formula as follows:

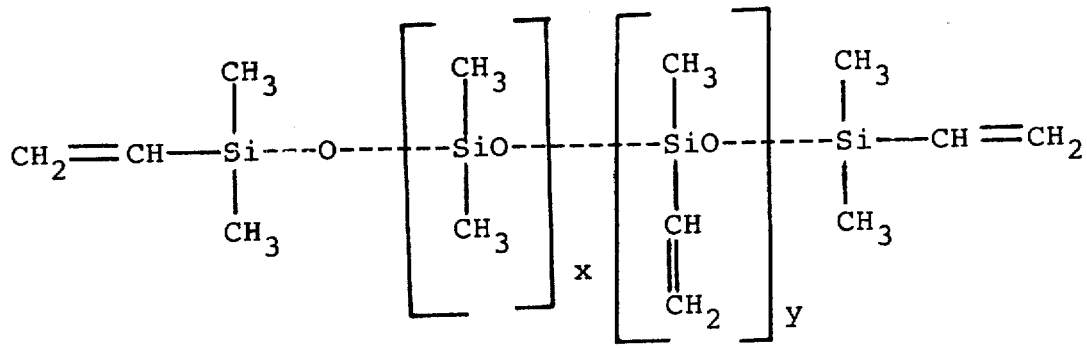

Column 12, line 25, change "and" to --or--.

Signed and Sealed this

Twenty-first Day of June 1983

[SEAL]

Attest:

DONALD J. QUIGG

Attesting Officer

Acting Commissioner of Patents and Trademarks